US012572477B2

(12) United States Patent
Pan et al.

(10) Patent No.: US 12,572,477 B2
(45) Date of Patent: Mar. 10, 2026

(54) PROCESSOR, ADDRESS TRANSLATION, BASED ON PLURALITY OF MEMORY MANAGEMENT UNITS (MMUs), METHOD AND APPARATUS, STORAGE MEDIUM, AND PROGRAM PRODUCT

(71) Applicant: Huawei Technologies Co., Ltd., Shenzhen (CN)

(72) Inventors: Wei Pan, Shenzhen (CN); Junping Luo, Shenzhen (CN); Tao Li, Shenzhen (CN); Kenneth Chong Yin Tan, Shenzhen (CN); Junlong Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/673,967

(22) Filed: May 24, 2024

(65) Prior Publication Data

US 2024/0330202 A1     Oct. 3, 2024

Related U.S. Application Data

(63) Continuation of application No. PCT/CN2022/110069, filed on Aug. 3, 2022.

(30) Foreign Application Priority Data

| Nov. 25, 2021 | (CN) | .......................... | 202111417305.9 |
| Jan. 25, 2022 | (CN) | .......................... | 202210087387.3 |

(51) Int. Cl.
*G06F 12/1009* (2016.01)

(52) U.S. Cl.
CPC .................................. *G06F 12/1009* (2013.01)

(58) Field of Classification Search
CPC .................................................... G06F 12/1009
See application file for complete search history.

(56) References Cited

U.S. PATENT DOCUMENTS

| 5,983,332 | A | 11/1999 | Watkins | |
| 10,725,915 | B1 * | 7/2020 | Jagtap | ................. G06F 12/0815 |
| 2013/0111158 | A1 * | 5/2013 | Suzuki | ................ G06F 12/0808 |
| | | | | 711/156 |
| 2014/0195742 | A1 | 7/2014 | Kim et al. | |
| 2015/0199280 | A1 | 7/2015 | Molnar et al. | |
| 2016/0170896 | A1 * | 6/2016 | Steiss | .................... G06F 12/109 |
| | | | | 711/154 |
| 2016/0328823 | A1 * | 11/2016 | Rao | ........................... G06T 1/60 |
| 2016/0378674 | A1 * | 12/2016 | Cheng | ................. G06F 12/1072 |
| | | | | 711/206 |

(Continued)

FOREIGN PATENT DOCUMENTS

| CN | 103914405 | A | 7/2014 |
| CN | 105302765 | A | 2/2016 |
| CN | 112748848 | A | 5/2021 |

*Primary Examiner* — Chie Yew
(74) *Attorney, Agent, or Firm* — Conley Rose, P.C.

(57) ABSTRACT

A plurality of physical cores of a processor share a memory management unit (MMU) pool comprising a plurality of MMUs. The plurality of MMUs provides each physical core with an address translation function from a virtual address (VA) to a physical address (PA). If an address translation requirement of a physical core is high, for example, when a main memory is concurrently accessed, the plurality of MMUs can serve the physical core.

20 Claims, 8 Drawing Sheets

(56) References Cited

U.S. PATENT DOCUMENTS

| | | | |
|---|---|---|---|
| 2017/0039396 A1* | 2/2017 | Sharp | G06F 12/1458 |
| 2017/0153983 A1* | 6/2017 | Sherlock | G06F 12/145 |
| 2017/0373839 A1* | 12/2017 | Suresh | G06F 21/44 |
| 2018/0239714 A1* | 8/2018 | Abhishek Raja | G06F 12/1027 |
| 2019/0042799 A1* | 2/2019 | Durham | G06F 21/64 |
| 2020/0278925 A1* | 9/2020 | Imamura | G06F 12/08 |
| 2021/0124533 A1 | 4/2021 | Gao et al. | |
| 2021/0314086 A1* | 10/2021 | Ansari | H04L 1/0041 |

* cited by examiner

This solution: Scenario 1 (The TLB and the
L1/L2/L3 are both missed)

Conventional technology: Scenario 1 (The TLB and
the L1/L2/L3 are both missed)

This solution: Scenario 3 (The TLB is missed, but
the L1/L2/L3 is hit)

Conventional technology: Scenario 3 (The TLB is
missed, but the L1/L2/L3 is hit)

PROCESSOR, ADDRESS TRANSLATION, BASED ON PLURALITY OF MEMORY MANAGEMENT UNITS (MMUs), METHOD AND APPARATUS, STORAGE MEDIUM, AND PROGRAM PRODUCT

CROSS-REFERENCE TO RELATED APPLICATIONS

This is a continuation of International Patent Application No. PCT/CN2022/110069 filed on Aug. 3, 2022, which claims priority to Chinese Patent Application No. 202111417305.9 filed on Nov. 25, 2021 and Chinese Patent Application No. 202210087387.3 filed on Jan. 25, 2022. All of the aforementioned patent applications are hereby incorporated by reference in their entireties.

TECHNICAL FIELD

This disclosure relates to the field of computer technologies, and in particular, to a processor, an address translation method and apparatus, a storage medium, and a program product.

BACKGROUND

Currently, most processors use a virtual address (VA) to perform memory addressing. When the VA is used, addressing space that is much larger than an actual physical address (PA) can be created. In a process of performing memory addressing by using the VA, the processor needs to translate the received VA into a PA. How to improve address translation efficiency of the processor is a current research hotspot.

SUMMARY

Embodiments of this disclosure provide a processor, an address translation method and apparatus, a storage medium, and a program product, to improve address translation efficiency of a processor. The technical solutions are as follows.

According to a first aspect, a processor is provided. The processor includes a plurality of physical cores and a memory management unit (MMU) pool. The MMU pool includes a plurality of MMUs, the plurality of physical cores are connected to the MMU pool through an internal bus of the processor, and the MMU pool provides the plurality of physical cores with an address translation function from a VA to a PA.

In brief, in this solution, the plurality of physical cores of the processor share the MMU pool, rather than that one physical core corresponds to one MMU. In this way, even if an address translation requirement of a physical core is high, for example, when a main memory is concurrently accessed, in this solution, the plurality of MMUs can serve the physical core, rather than that the physical core is limited to be served by a single MMU, thereby improving address translation efficiency and accelerating memory access.

Optionally, the MMU pool further provides the address translation function for a peripheral of the processor. In other words, this solution can further improve the address translation efficiency in a process in which the peripheral accesses the main memory. The peripheral of the processor includes a physical network interface card, a graphics card, and the like that are outside the processor. Optionally, the peripheral of the processor alternatively includes a chip or component that includes a function of a network interface card, a graphics card, or the like and that is inside the processor.

Optionally, the MMU pool is located in a home agent (HA) or a memory controller (MC) of the processor. In other words, address translation (including page table walk) is performed close to the main memory, thereby effectively reducing an address translation latency. Especially in a case of a multi-level page table, the address translation efficiency is higher.

Optionally, a first physical core is configured to send an address translation request to the MMU pool, where the address translation request carries a to-be-translated first VA. The first physical core is any one of the plurality of physical cores. The MMU pool is configured to receive the address translation request, translate the first VA into a first PA, and send an address translation response to the first physical core, where the address translation response carries the first PA. The first physical core is further configured to receive the address translation response.

Optionally, the first physical core is configured to query, for a page table entry in which the first VA is located, a translation lookaside buffer (TLB) corresponding to the first physical core. If the TLB does not cache the page table entry in which the first VA is located, the first physical core sends the address translation request to the MMU pool. One page table entry includes a mapping relationship between one VA and one PA. The MMU pool is configured to query a memory page table for the page table entry in which the first VA is located, to obtain the first PA corresponding to the first VA. The memory page table records page table entries in which all VAs in the main memory are located. In other words, in an implementation, the TLB close to the physical core is first queried for a table, to quickly obtain the corresponding page table entry from the buffer. If the page table entry is missed in the TLB, the MMU pool close to the main memory performs page table walk, to quickly obtain the corresponding page table entry from the memory page table.

Optionally, the memory page table is a single-level page table or a multi-level page table.

According to a second aspect, an address translation method is provided, and the method is applied to a processor. The processor includes a plurality of physical cores and an MMU pool. The MMU pool includes a plurality of MMUs, and the plurality of physical cores are connected to the MMU pool through an internal bus of the processor. The method includes:

A first physical core sends an address translation request to the MMU pool, where the address translation request carries a to-be-translated first VA, and the first physical core is any one of the plurality of physical cores. The first physical core receives an address translation response sent by the MMU pool, where the address translation response carries a first PA corresponding to the first VA.

In other words, the MMU pool provides the plurality of physical cores with an address translation function from a VA to a PA. In brief, in this solution, the plurality of physical cores of the processor share the MMU pool, rather than that one physical core corresponds to one MMU. In this way, even if an address translation requirement of a physical core is high, for example, when a main memory is concurrently accessed, in this solution, the plurality of MMUs can serve the physical core, rather than that the physical core is limited to be served by a single MMU, thereby improving address translation efficiency and accelerating memory access.

Optionally, before the first physical core sends the address translation request to the MMU pool, the method further includes: the first physical core queries, for a page table entry in which the first VA is located, a TLB corresponding to the first physical core, where one page table entry includes a mapping relationship between one VA and one PA. If the TLB does not cache the page table entry in which the first VA is located, the first physical core performs an operation of sending the address translation request to the MMU pool.

According to a third aspect, an address translation method is provided. The method is applied to a processor, and the processor includes a plurality of physical cores and an MMU pool. The MMU pool includes a plurality of MMUs, and the plurality of physical cores are connected to the MMU pool through an internal bus of the processor. The method includes:

The MMU pool receives an address translation request sent by a first physical core, where the address translation request carries a to-be-translated first VA, and the first physical core is any one of the plurality of physical cores. The MMU pool translates the first VA into a first PA. The MMU pool sends an address translation response to the first physical core, where the address translation response carries the first PA. In other words, the MMU pool provides the plurality of physical cores with an address translation function from a VA to a PA. In brief, in this solution, the plurality of physical cores of the processor share the MMU pool, rather than that one physical core corresponds to one MMU.

Optionally, that the MMU pool translates the first VA into a first PA includes: the MMU pool queries a memory page table for a page table entry in which the first VA is located, to obtain the first PA corresponding to the first VA. The memory page table records page table entries in which all VAs in a main memory are located, and one page table entry includes a mapping relationship between one VA and one PA.

Optionally, the plurality of MMUs correspond to one management module. That the MMU pool translates the first VA into a first PA includes: the MMU pool selects, from the plurality of MMUs by using the management module, one MMU as a target MMU; and the MMU pool translates the first VA into the first PA by using the target MMU.

According to a fourth aspect, an address translation apparatus is provided. The address translation apparatus has a function of implementing behavior of the address translation method in the second aspect. The address translation apparatus includes one or more modules, and the one or more modules are configured to implement the address translation method provided in the second aspect.

In other words, an address translation apparatus is provided. The apparatus is used in a processor, and the processor may be the processor provided in the first aspect. To be specific, the processor includes a plurality of physical cores and an MMU pool. The MMU pool includes a plurality of MMUs, and the plurality of physical cores are connected to the MMU pool through an internal bus of the processor. The apparatus is used in a first physical core, and the first physical core is any one of the plurality of physical cores. The apparatus includes: a sending module, configured to send an address translation request to the MMU pool, where the address translation request carries a to-be-translated first VA; and a receiving module, configured to receive an address translation response sent by the MMU pool, where the address translation response carries a first PA corresponding to the first VA.

Optionally, the apparatus further includes: a table querying module, configured to query, for a page table entry in which the first VA is located, a TLB corresponding to the first physical core, where one page table entry includes a mapping relationship between one VA and one PA; and a trigger module, configured to: if the TLB does not cache the page table entry in which the first VA is located, trigger the sending module to perform an operation of sending the address translation request to the MMU pool.

According to a fifth aspect, an address translation apparatus is provided. The address translation apparatus has a function of implementing behavior of the address translation method in the third aspect. The address translation apparatus includes one or more modules, and the one or more modules are configured to implement the address translation method provided in the third aspect.

In other words, an address translation apparatus is provided. The apparatus is used in a processor, and the processor may be the processor provided in the first aspect. To be specific, the processor includes a plurality of physical cores and an MMU pool. The MMU pool includes a plurality of MMUs, and the plurality of physical cores are connected to the MMU pool through an internal bus of the processor. The apparatus is used in the MMU pool. The apparatus includes: a receiving module, configured to receive an address translation request sent by a first physical core, where the address translation request carries a to-be-translated first VA, and the first physical core is any one of the plurality of physical cores; an address translation module, configured to translate the first VA into a first PA; and a sending module, configured to send an address translation response to the first physical core, where the address translation response carries the first PA.

Optionally, the address translation module is configured to: query a memory page table for a page table entry in which the first VA is located, to obtain the first PA corresponding to the first VA, where the memory page table records page table entries in which all VAs in a main memory are located, and one page table entry includes a mapping relationship between one VA and one PA.

Optionally, the plurality of MMUs correspond to one management module. The address translation module is configured to: select, from the plurality of MMUs by using the management module, one MMU as a target MMU; and translate the first VA into the first PA by using the target MMU.

According to a sixth aspect, a computer device is provided. The computer device includes a processor and a memory. The processor is the processor provided in the first aspect. The memory is configured to store a program for executing the address translation methods provided in the second aspect and the third aspect, and store data for implementing the address translation methods provided in the second aspect and the third aspect. The processor is configured to execute the program stored in the memory. An operation apparatus of the computer device may further include a communication bus, and the communication bus is configured to establish a connection between the processor and the memory.

According to a seventh aspect, a computer-readable storage medium is provided. The computer-readable storage medium stores instructions, and when the instructions are run on a computer, the computer is enabled to perform the address translation method in the second aspect and/or the third aspect.

According to an eighth aspect, a computer program product including instructions is provided. When the computer program product runs on a computer, the computer is enabled to perform the address translation method in the second aspect and/or the third aspect.

Technical effects obtained in the fourth aspect, the fifth aspect, the sixth aspect, the seventh aspect, and the eighth aspect are similar to technical effects obtained through corresponding technical means in the first aspect, the second aspect, or the third aspect. Details are not described herein again.

Technical solutions provided in embodiments of this disclosure can have at least the following beneficial effects.

In this solution, a plurality of physical cores of a processor share an MMU pool. To be specific, a plurality of MMUs provide each physical core with an address translation function from a VA to a PA, rather than that one physical core corresponds to one MMU. In this way, even if an address translation requirement of a physical core is high, for example, when a main memory is concurrently accessed, in this solution, the plurality of MMUs can serve the physical core, rather than that the physical core is limited to be served by a single MMU, thereby improving address translation efficiency and accelerating memory access.

DESCRIPTION OF EMBODIMENTS

To make objectives, technical solutions, and advantages of embodiments of this disclosure clearer, the following further describes implementations of this disclosure in detail with reference to the accompanying drawings.

It should be noted that the system architecture and the service scenario described in embodiments of this disclosure are intended to describe the technical solutions in embodiments of this disclosure more clearly, and do not constitute a limitation on the technical solutions provided in embodiments of this disclosure. A person of ordinary skill in the art may know that, with evolution of the system architecture and emergence of new service scenarios, the technical solutions provided in embodiments of this disclosure are also applicable to similar technical problems.

Figure 1:
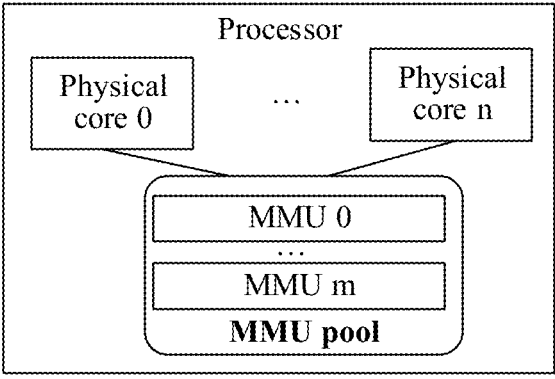
FIG. 1 is a schematic diagram of a structure of a processor according to an embodiment of this disclosure.

FIG. 1 is a schematic diagram of a structure of a processor according to an embodiment of this disclosure. Refer to FIG. 1. The processor includes a plurality of physical cores and an MMU pool, and the MMU pool includes a plurality of MMUs. The plurality of physical cores includes a physical core 0 to a physical core n, and the plurality of MMUs include an MMU 0 to an MMU m. The plurality of physical cores is connected to the MMU pool through an internal bus of the processor. The MMU pool provides the plurality of physical cores with an address translation function from a VA to a PA.

Optionally, the address translation function includes a page table walk function that is based on a memory page table, for example, a page table walk function. In this case, to improve page table walk efficiency, especially page table walk efficiency in a case of a multi-level page table, in an implementation, the MMU pool is located in an HA or an MC of the processor. In other words, page table walk is performed close to a main memory, thereby effectively reducing a memory access latency.

Optionally, the MMU pool further provides the address translation function for a peripheral of the processor. The peripheral includes a physical network interface card, a graphics card, and the like that are outside the processor. Optionally, the peripheral alternatively includes a chip or component that includes of a network interface card, a graphics card, or the like and that is inside the processor.

Figure 2:
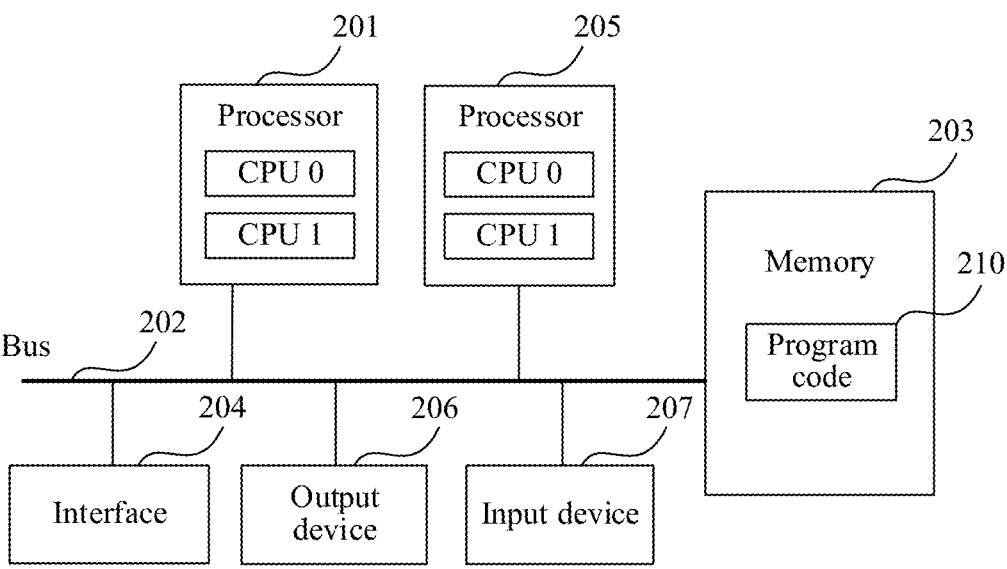
FIG. 2 is a schematic diagram of a structure of a computer device according to an embodiment of this disclosure.

FIG. 2 is a schematic diagram of a structure of a computer device according to an embodiment of this disclosure. Optionally, the computer device includes one or more processors 201, a bus 202, a memory 203, and one or more interfaces 204. Optionally, the one or more processors 201 include the processor shown in FIG. 1.

The processor 201 is a general-purpose central processing unit (CPU), a network processor (NP), a microprocessor, or one or more integrated circuits configured to implement the solutions in this disclosure, for example, an application-specific integrated circuit (ASIC), a programmable logic device (PLD), or a combination thereof. Optionally, the PLD is a complex programmable logic device (CPLD), a field-programmable gate array (FPGA), generic array logic (GAL), or any combination thereof.

The bus 202 is configured to transmit information between the foregoing components. Optionally, the bus 202 is classified into an address bus, a data bus, a control bus, and the like. For ease of representation, only one thick line is used to represent the bus 202 in the figure, but this does not mean that there is only one bus or only one type of bus. Optionally, the bus is also referred to as a communication bus.

Optionally, the memory 203 is a read-only memory (ROM), a random-access memory (RAM), an electrically erasable programmable read-only memory (EEPROM), an optical disc (including a compact disc read-only memory (CD-ROM), a compact disc, a laser disc, a digital versatile disc, a BLU-RAY disc, or the like), a magnetic disk storage medium or another magnetic storage device, or any other medium that can be configured to carry or store expected program code in a form of an instruction or a data structure and that can be accessed by a computer. However, this does not constitute a limitation herein. The memory 203 exists independently, and is connected to the processor 201 through the bus 202, or the memory 203 is integrated with the processor 201.

The interface 204 is configured to communicate with another device or a communication network by using any transceiver-type apparatus. Optionally, the interface is also referred to as a communication interface. The interface 204 includes a wired communication interface, and optionally, further includes a wireless communication interface. The wired communication interface is, for example, an Ethernet interface. Optionally, the Ethernet interface is an optical interface, an electrical interface, or a combination thereof. The wireless communication interface is a wireless local area network (WLAN) interface, a cellular network communication interface, a combination thereof, or the like.

Optionally, in some embodiments, the computer device includes a plurality of processors, for example, the processor 201 and a processor 205 shown in FIG. 2. Each of these processors is a single-core processor or a multi-core processor. Optionally, the processor herein is one or more devices, circuits, and/or processing cores for processing data (for example, computer program instructions).

In a specific implementation, in an embodiment, the computer device further includes an output device 206 and an input device 207. The output device 206 communicates with the processor 201, and may display information in a plurality of manners. For example, the output device 206 is a liquid-crystal display (LCD), a light-emitting diode (LED) display device, a cathode-ray tube (CRT) display device, a projector, or the like. The input device 207 communicates with the processor 201, and may receive an input from a user in a plurality of manners. For example, the input device 207 is a mouse, a keyboard, a touchscreen device, a sensing device, or the like.

In some embodiments, the memory 203 is configured to store program code 210 for executing the solutions in this disclosure, and the processor 201 can execute the program code 210 stored in the memory 203. The program code 210 includes one or more software modules. The computer device can implement, by using the processor 201 and the program code 210 in the memory 203, an address translation method provided in the following embodiment in FIG. 3.

Figure 3:
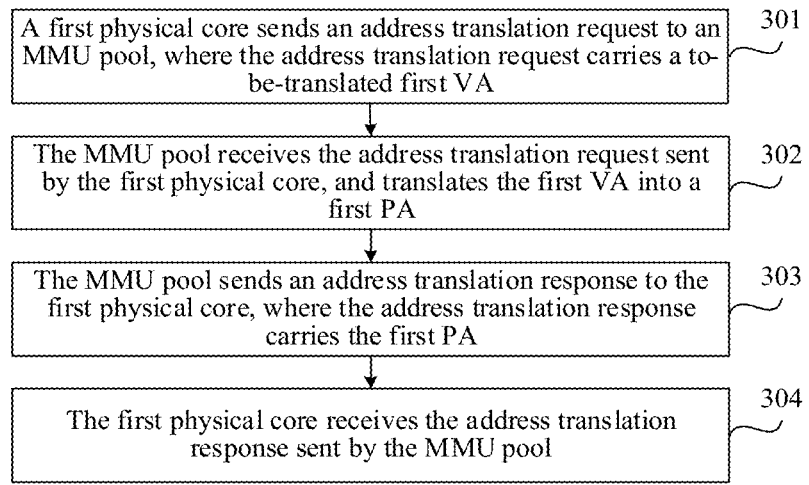
FIG. 3 is a flowchart of an address translation method according to an embodiment of this disclosure.

FIG. 3 is a flowchart of an address translation method according to an embodiment of this disclosure. The method is applied to a processor. Refer to FIG. 3. The method includes the following steps.

Step 301: A first physical core sends an address translation request to an MMU pool, where the address translation request carries a to-be-translated first VA.

It can be learned from the foregoing descriptions that, in embodiments of this disclosure, the processor includes the plurality of physical cores and the MMU pool, the MMU pool includes the plurality of MMUs, the plurality of physical cores are connected to the MMU pool through the internal bus of the processor, and the MMU pool provides the plurality of physical cores with the address translation function from a VA to a PA, namely, an address conversion function. Any one of the plurality of physical cores can perform address translation by using the MMU pool. An example in which the first physical core performs address translation by using the MMU pool is used for description below. The first physical core is any one of the plurality of physical cores.

In this embodiment of this disclosure, the first physical core sends the address translation request to the MMU pool, where the address translation request carries the to-be-translated first VA. Optionally, before sending the address translation request to the MMU pool, the first physical core obtains the first VA, and generates the address translation request that carries the first VA. For example, the first physical core obtains a virtual address sent by an application program, where the virtual address is for performing data access. The first physical core uses the VA as the first VA, and generates the address translation request that carries the first VA.

Optionally, the first physical core corresponds to a TLB. Before sending the address translation request to the MMU pool, the first physical core queries, for a page table entry in which the first VA is located, the TLB corresponding to the first physical core. If the TLB does not cache the page table entry in which the first VA is located, the first physical core sends the address translation request to the MMU pool. One page table entry includes a mapping relationship between one VA and one PA. If the TLB caches the page table entry in which the first VA is located, the first physical core obtains, from the page table entry, a first PA corresponding to the first VA. It should be noted that the TLB is configured to cache a mapping relationship between a virtual address and a physical address that are in the main memory recently accessed by the processor, and the memory page table stores all mapping relationships between virtual addresses and physical addresses in the main memory. In other words, the memory page table records page table entries in which all virtual addresses in the main memory are located, and the TLB stores a part of the page table entries in the memory page table. In some cases, the TLB may alternatively cache all the page table entries in the memory page table. In brief, during address translation, if the page table entry is hit in the TLB, the first physical core directly obtains the physical address in the TLB; or if the page table entry is missed in the TLB (miss), the first physical core performs address translation by using the MMU pool.

Optionally, the address translation function provided by the MMU pool includes the page table walk function that is based on the memory page table, for example, the page table walk function. In this case, to improve the page table walk efficiency, especially the page table walk efficiency in the case of the multi-level page table, the MMU pool is located in the HA or the MC of the processor. In other words, page table walk is performed close to the main memory, thereby effectively reducing the memory access latency. In addition, in embodiments of this disclosure, one physical core corresponds to one TLB, and the TLB is located next to the physical core. In other words, the TLB is located close to the physical core, so that a corresponding page table entry is quickly obtained from the buffer.

In some other embodiments, the TLB can perform hierarchical pooling, and the address translation function provided by the MMU pool includes not only the page table walk function, but also a function corresponding to the TLB. In brief, the MMU pool includes not only a plurality of page table walk units (that is, the plurality of MMUs), but also a plurality of hierarchical TLBs. Correspondingly, after obtaining the first VA, the first physical core sends the address translation request to the MMU pool, to indicate the MMU pool to perform address translation through the function corresponding to the TLB and the page table walk function.

Step 302: The MMU pool receives the address translation request sent by the first physical core, and translates the first VA into the first PA.

In this embodiment of this disclosure, after receiving the address translation request sent by the first physical core, the MMU pool translates the first VA into the first PA through the address translation function.

Optionally, if the address translation request is received when the TLB corresponding to the first physical core does not cache the page table entry in which the first VA is located, and the MMU pool provides the page table walk function, after receiving the address translation request, the MMU pool queries the memory page table for the page table entry in which the first VA is located, to obtain the first PA corresponding to the first VA. The memory page table records page table entries in which all VAs in the main memory are located. To be specific, the first physical core queries the TLB, and when the page table entry is missed in the TLB, the MMU pool performs page table walk.

In some other embodiments, the address translation request is sent by the first physical core to the MMU pool after the first VA is obtained, and the MMU pool provides the function corresponding to the TLB and the page table walk function. In this case, after receiving the address translation request, the MMU pool queries the hierarchical TLB for the page table entry in which the first VA is located. If the hierarchical TLB does not cache the page table entry in which the first VA is located, the MMU pool queries the memory page table for the page table entry in which the first VA is located, to obtain the first PA corresponding to the first VA. If the hierarchical TLB caches the page table entry in which the first VA is located, the MMU pool obtains, from the hierarchical TLB, the first PA corresponding to the first VA.

It can be learned from the foregoing descriptions that the MMU pool includes the plurality of MMUs. Therefore, after receiving the address translation request, the MMU pool needs to determine one MMU from the plurality of MMUs to perform address translation. Optionally, the plurality of MMUs correspond to one management module, and an implementation in which the MMU pool translates the first VA into the first PA is as follows: the MMU pool selects, from the plurality of MMUs by using the management module, one MMU as a target MMU, and the MMU pool translates the first VA into the first PA by using the target MMU. The management module may select one MMU from the plurality of MMUs according to a load balancing policy or in another manner. For example, the management module randomly selects one MMU from idle MMUs. Certainly, the MMU pool may alternatively determine one target MMU from the plurality of MMUs by using another method. This is not limited in this embodiment of this disclosure.

Optionally, in this embodiment of this disclosure, the memory page table is a single-level page table or a multi-level page table. In an application in which the memory page table is a single-level page table, the MMU pool sends the first VA to the MC via the HA by using the target MMU, to query the memory page table for the first PA corresponding to the first VA. In an application in which the memory page table is a multi-level page table, the MMU pool parses the first VA by using the target MMU, to sequentially obtain a plurality of levels of indexes. Each time an index of one level is obtained, the MMU pool sends a query request to the MC via the HA based on the obtained index, to query for corresponding information in a page table with a corresponding level in the memory page table, until a last query request is sent to the MC via the HA based on an index (for example, an address offset) obtained through last parsing, to obtain the first PA returned by the MC, or obtain the page table entry in which the first VA is located, where the page table entry is returned by the MC. It should be noted that for a specific implementation of the page table walk function, refer to another technology. Details are not described in this embodiment of this disclosure.

It can be seen that, in this solution, because the MMU pool is located in the HA or the MC, that is, located close to the main memory, the address translation efficiency can be improved. Especially in the application with a multi-level page table, in this solution, an address translation latency can be effectively reduced. However, in the other technology, the MMU is located far away from the HA (for example, located in the physical core), and the MMU needs to interact with the HA to access the main memory and query for a corresponding PA. Duration of an interaction process between the MMU and the HA is long, that is, the memory access latency is high. In addition, currently, most memory page tables are multi-level page tables. In an application with a multi-level page table, in the other technology, a page table walk operation is completed only after a plurality of times of interaction are performed between the MMU and the HA, and overheads such as the memory access latency are large.

Step 303: The MMU pool sends an address translation response to the first physical core, where the address translation response carries the first PA.

In this embodiment of this disclosure, after translating the first VA into the first PA, the MMU pool sends the address translation response to the first physical core, where the address translation response carries the first PA or carries a mapping relationship between the first VA and the first PA. Optionally, the MMU pool sends the address translation response to the first physical core by using the target MMU.

Step 304: The first physical core receives the address translation response sent by the MMU pool.

In this embodiment of this disclosure, the first physical core receives the address translation response sent by the MMU pool, where the address translation response carries the first PA, or carries the mapping relationship between the first VA and the first PA. Optionally, the first physical core stores the mapping relationship between the first VA and the first PA in a corresponding TLB.

Optionally, the first VA is for performing data access. For example, the first VA is a VA for an application program to perform data access. Therefore, after obtaining the first PA, the first physical core queries a data cache for corresponding first data based on the first PA, and returns the first data to the application program. If the first data corresponding to the first PA is cached in the data cache, the first physical core obtains the first data from the data cache. If the first data is not cached in the data cache, the first physical core obtains the first data from the main memory, or obtains the first data in another manner. The data cache includes a level 1/level 2/level 3 (level 1/level 2/level 3, L1/L2/L3) cache and the like.

Optionally, the MMU pool further provides the address translation function for the peripheral of the processor. In the other technology, the peripheral performs address translation by using a system memory management unit (SMMU). The SMMU includes the TLB and the page table walk unit, and the SMMU is located next to an IIO of the processor. In this solution, the page table walk unit in the SMMU is moved to the MMU pool, and the MMU pool provides the address translation function for the peripheral.

In this embodiment of this disclosure, a virtual address obtained by the peripheral is referred to as an input/output VA (IOVA). After obtaining a first IOVA, a peripheral queries the corresponding TLB for a page table entry in which the first IOVA is located. If the TLB does not cache the page table entry in which the first IOVA is located, the peripheral sends an address translation request to the MMU pool. One page table entry includes a mapping relationship between one IOVA and one PA. The MMU pool queries the memory page table for the page table entry in which the first IOVA is located, to obtain a PA corresponding to the first IOVA. The MMU pool returns, to the peripheral, the PA corresponding to the first IOVA. If the TLB caches the page table entry in which the first IOVA is located, the peripheral obtains, from the page table entry, a first PA corresponding to the first IOVA.

Figure 4:
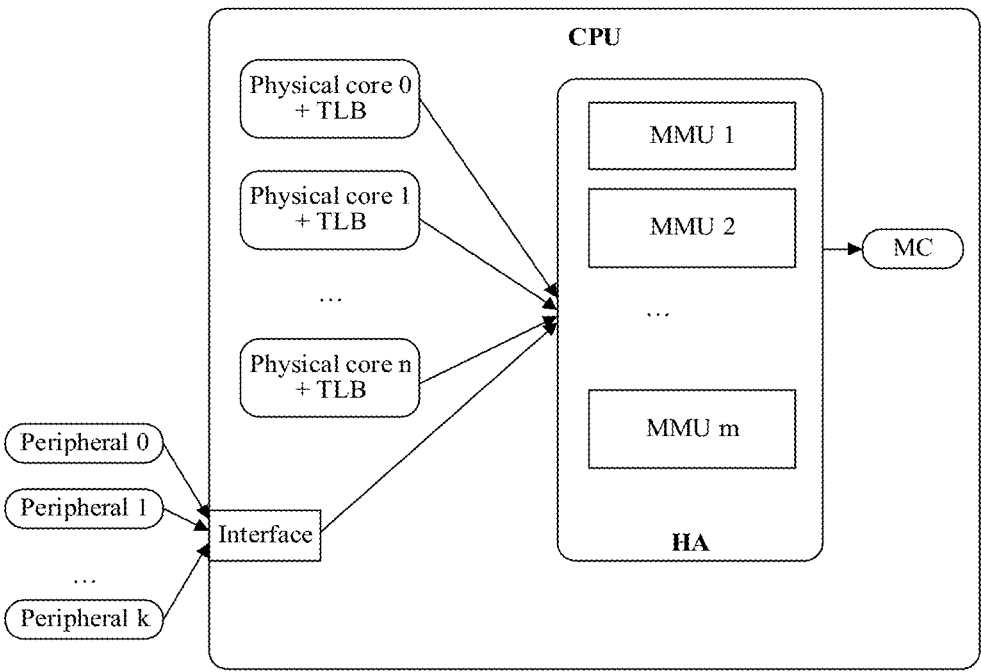
FIG. 4 is a schematic diagram of a structure of another processor according to an embodiment of this disclosure.

FIG. 4 is a schematic diagram of a structure of another processor according to an embodiment of this disclosure. Refer to FIG. 4. The processor (for example, a CPU) includes a plurality of physical cores (for example, a physical core 0 to a physical core n), a TLB located in each physical core, and an MMU pool (including an MMU 0 to an MMU m) located in an HA. The processor further includes an MC and the like. The MMU pool provides the plurality of physical cores with an address translation function including page table walk. Optionally, as shown in FIG. 4, the processor further includes an interface configured to connect to a peripheral. The peripheral is, for example, a network interface card or a graphics card. Correspondingly, the MMU pool further provides the address translation function for the peripheral of the processor.

Figure 5:
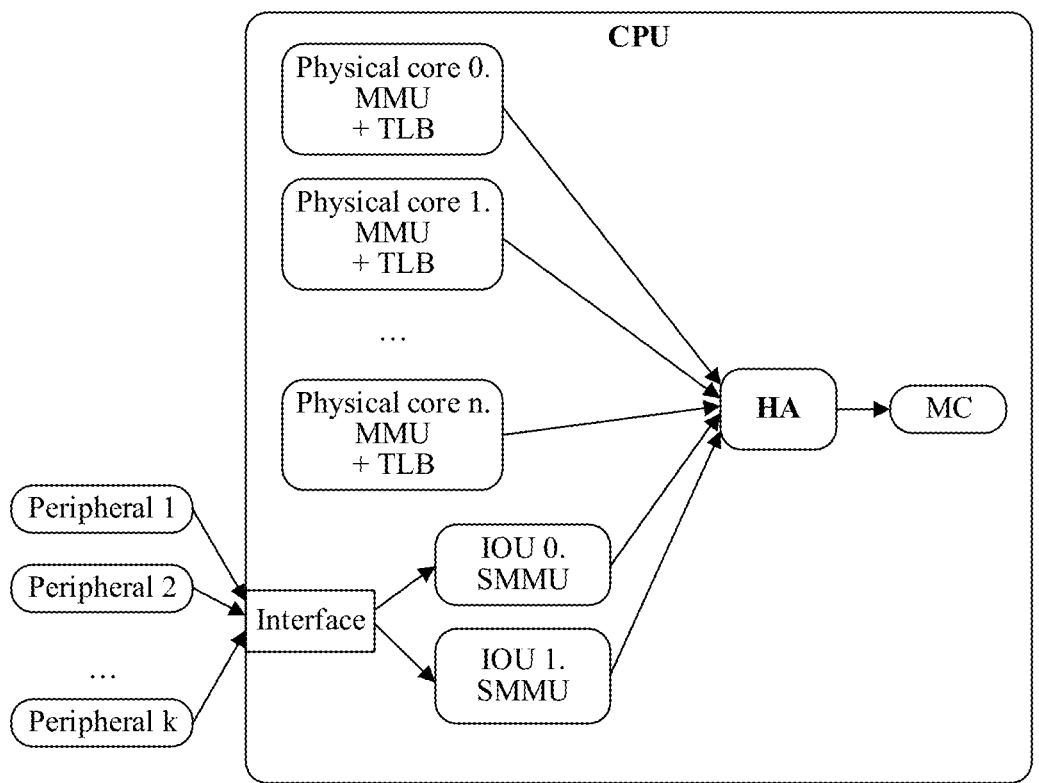
FIG. 5 is a schematic diagram of a structure of a processor in another technology according to an embodiment of this disclosure.

FIG. 5 is a schematic diagram of a structure of a processor in another technology according to an embodiment of this disclosure. A difference between the processor shown in FIG. 4 and the processor shown in FIG. 5 lies in that each physical core of the processor in FIG. 5 corresponds to one MMU, and the MMU corresponding to each physical core is located next to the physical core. The processor further includes one or more peripheral processing units, for example, an input/output unit (IOU), and an SMMU corresponding to the peripheral is located in the peripheral processing unit. It can be learned from FIG. 5 that, in the other technology, physical cores cannot share the MMU. If a physical core has a high address translation requirement, a corresponding MMU cannot meet the requirement, resulting in low address translation efficiency. The same is also true for the SMMU. In addition, in the other technology, page table walk units in the MMU and the SMMU are both far away from a main memory. When the page table entry is missed in a TLB, a latency of accessing the main memory by interacting with an HA and an MC to perform address translation is high.

It can be learned from FIG. 4 and the foregoing descriptions that, in this solution, the page table walk unit of the MMU is moved from the physical core or the SMMU to the HA or the MC, and page table walk is performed closer to the main memory, to reduce a main memory access latency as much as possible, improve address translation efficiency from a VA to a PA, and further improve data access efficiency. In addition, the HA and the MC are shared by the physical cores in the processor. Therefore, when the page table walk unit is moved to the HA or the MC, the page table walk unit can be shared among a plurality of physical cores, and does not need to be in one-to-one correspondence with the physical core. In some embodiments, circuit resources of a processor chip can be saved.

Figure 6:
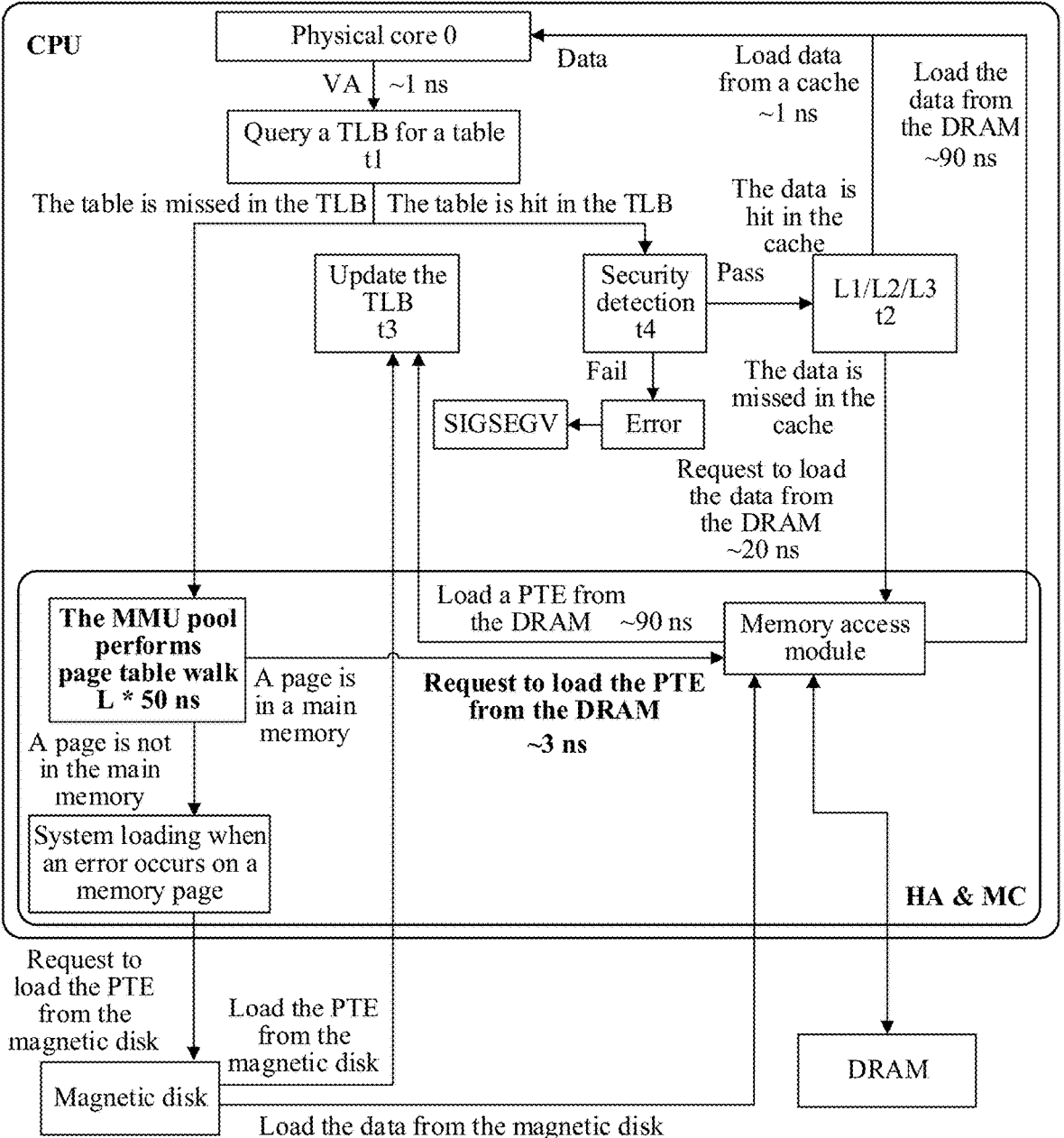
FIG. 6 is a flowchart of another address translation method according to an embodiment of this disclosure.
Figure 7:
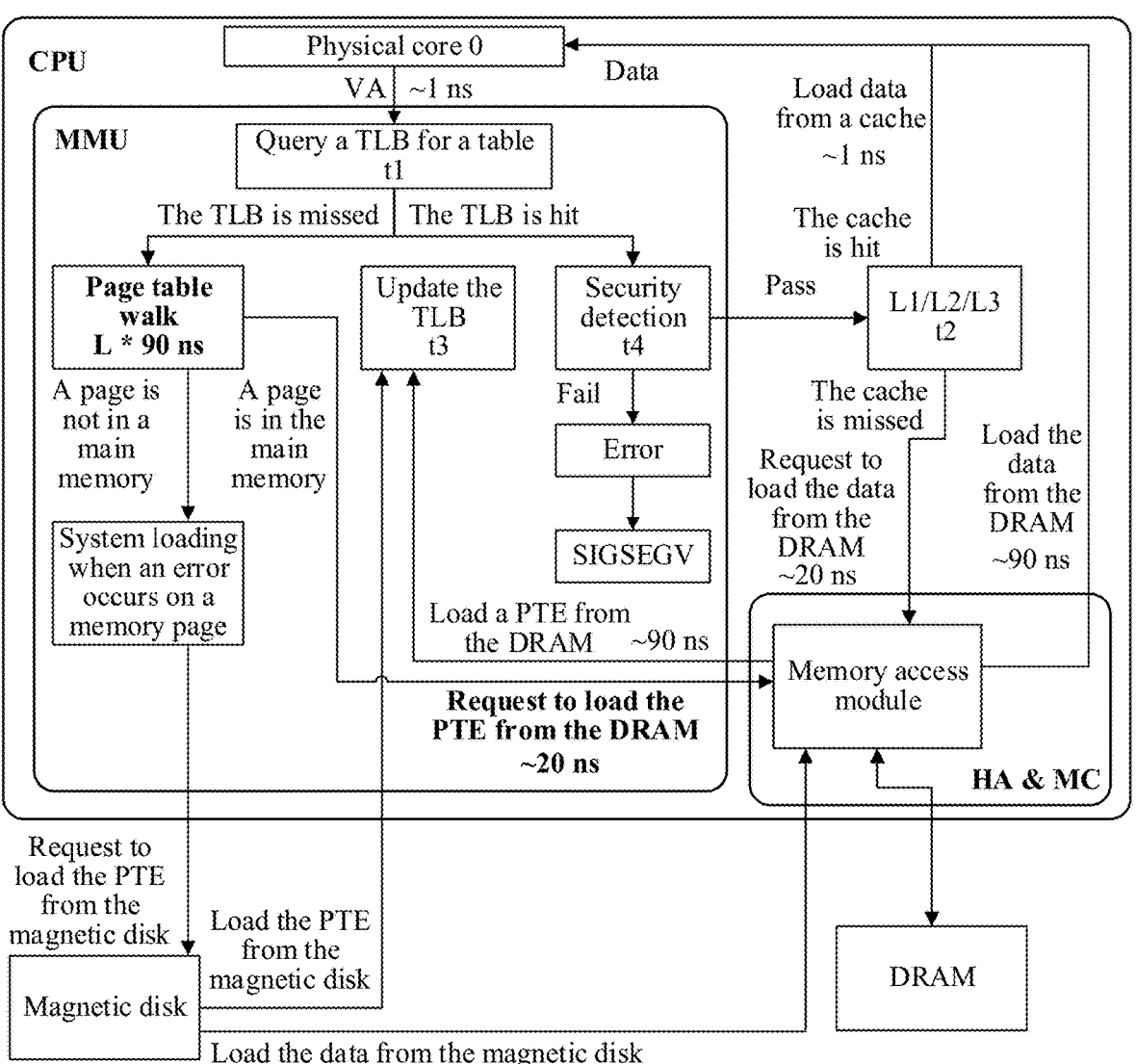
FIG. 7 is a flowchart of an address translation method in another technology according to an embodiment of this disclosure.

FIG. 6 is a flowchart of another address translation method according to an embodiment of this disclosure. A procedure shown in FIG. 6 is implemented based on the processor shown in FIG. 4. FIG. 7 is a flowchart of an address translation method in another technology according to an embodiment of this disclosure. A procedure shown in FIG. 7 is implemented based on the processor shown in FIG. 5.

Refer to FIG. 6. It is assumed that a quantity of levels of a memory page table is L, an MMU pool is located in an HA or an MC, and the MMU pool includes a page table walk unit in FIG. 6. In this solution, when a physical core needs to perform address translation, the physical core first queries a TLB for a table, to be specific, queries the TLB for a page table entry in which a VA is located. Duration for querying the TLB for the table is approximately t1. If the page table entry is missed in the TLB, the physical core sends an address translation request to the MMU pool. The MMU pool performs page table walk by using the HA and the MC. Duration for the page table walk is approximately L*50 nanoseconds (ns). In a page table walk process, if a queried page is in a main memory, the MMU pool requests to load, from the main memory (for example, a dynamic random-access memory (DRAM)), the page table entry in which the VA is located, and approximately 3 ns are consumed. The MMU pool loads the page table entry from the DRAM to the TLB for caching by using a memory access module of the HA and the MC, that is, updates the TLB. It takes approximately 90 ns to load the page table entry from the DRAM, and approximately t3 to update the TLB. If the queried page is not in the main memory, the MMU pool requests to load the page table entry from a magnetic disk (for example, a disk). If the TLB is hit, the physical core obtains the corresponding page table entry from the TLB, that is, obtains a PA. Optionally, after obtaining the PA, the physical core performs security detection (for example, protection check). If the security detection is not passed, the physical core processes a corresponding error, for example, generates a signal segment violation (SIGSEGV). After the security detection is passed (for example, access permitted), the physical core obtains corresponding data from a data cache (for example, an L1/L2/L3 cache) based on the PA, and duration consumed for searching the data from the data cache is approximately t2. If the data is hit in the data cache, that is, the corresponding data is found, the physical core loads the data from the data cache. Duration consumed for data loading is approximately 1 ns. If the data is missed in the data cache, the physical core requests to load the data from the main memory. Duration consumed for requesting is approximately 20 ns. Duration consumed for loading the data from the main memory is approximately 90 ns.

A difference between the processing procedure in FIG. 7 and the processing procedure in FIG. 6 lies in that, in the other technology shown in FIG. 7, a physical core is in one-to-one correspondence with an MMU, and the MMU is located next to the physical core. If the page table entry is missed in a TLB, the physical core performs page table walk by using the corresponding MMU. Duration consumed for the page table walk is approximately L*90 ns. In addition, in the other technology, duration consumed for requesting to load a page table entry from a main memory is approximately 20 ns.

Figure 8:
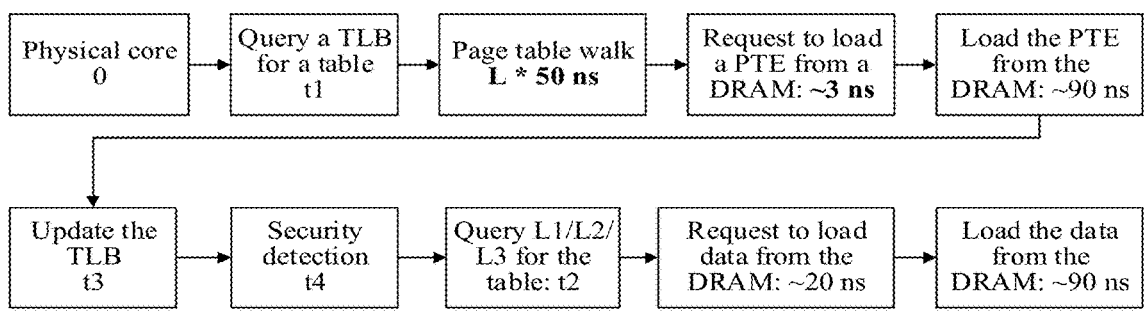
FIG. 8 is a flowchart of accessing data corresponding to a VA in a scenario 1 in this solution according to an embodiment of this disclosure.
Figure 9:
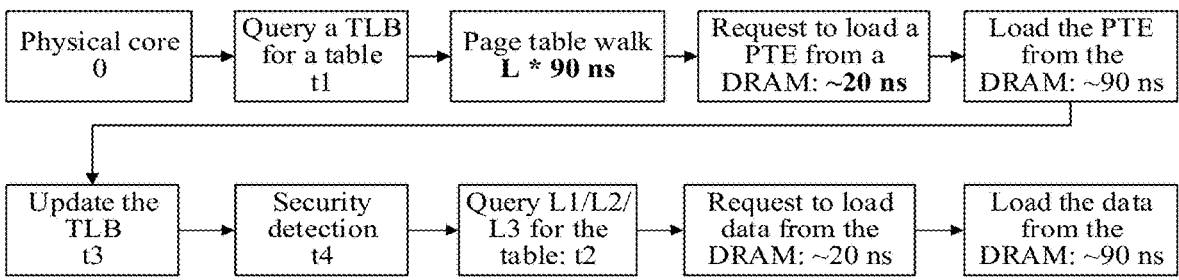
FIG. 9 is a flowchart of accessing data corresponding to a VA in a scenario 1 in another technology according to an embodiment of this disclosure.
Figure 10:
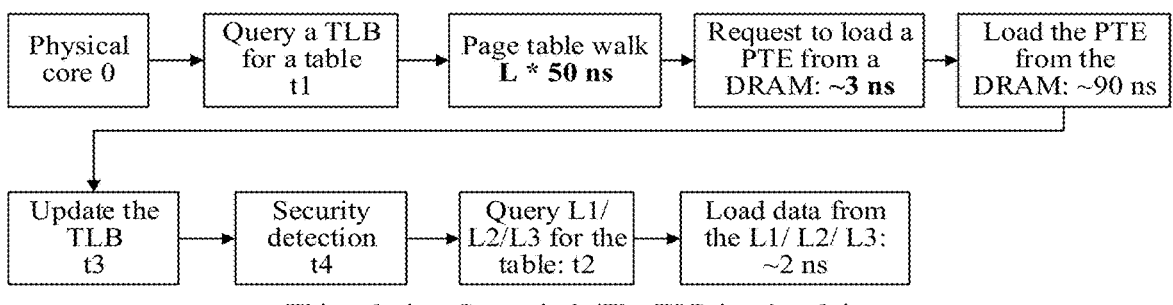
FIG. 10 is a flowchart of accessing data corresponding to a VA in a scenario 3 in this solution according to an embodiment of this disclosure.
Figure 11:
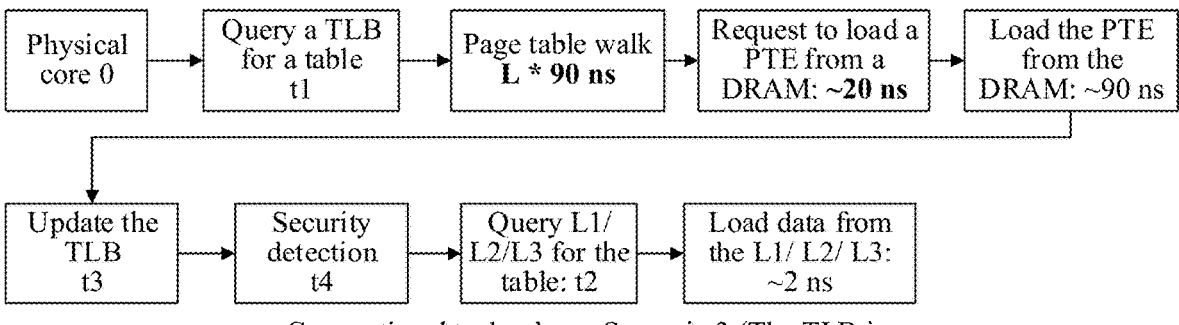
FIG. 11 is a flowchart of accessing data corresponding to a VA in a scenario 3 in another technology according to an embodiment of this disclosure.

FIG. 6 and FIG. 7 show time overheads in four scenarios when a physical core accesses data corresponding to a VA. A scenario 1 is a scenario in which the page table entry is missed in both the TLB and the L1/L2/L3. A scenario 2 is a scenario in which the page table entry is hit in both the TLB and the L1/L2/L3. A scenario 3 is a scenario in which the page table entry is missed in the TLB but the L1/L2/L3 is hit. A scenario 4 is a scenario in which the page table entry is hit in the TLB but is missed in the L1/L2/L3. In the scenario 2 and the scenario 4, that is, in scenarios in which the TLB is hit, time overheads of accessing the data corresponding to the VA in this solution are basically the same as those in the other technology. However, in the scenario 1 and the scenario 3, that is, in scenarios in which the page table entry is missed in the TLB, in comparison with the other technology, this solution can save a lot of time overheads. FIG. 8 and FIG. 9 respectively show procedures of accessing data corresponding to a VA in this solution and another technology in the scenario 1. FIG. 10 and FIG. 11 respectively show procedures of accessing data corresponding to a VA in this solution and another technology in the scenario 3. The procedures shown in FIG. 8 to FIG. 11 are consistent with the related procedures in FIG. 6 and FIG. 7. Details are not described herein again.

Table 1 shows comparison between the time overheads of accessing the data corresponding to the VA in this solution and the other technology in the foregoing scenario 1 and scenario 3. It can be learned that, when the page table entry is missed in the TLB, in comparison with the other technology, this solution can save a lot of time overheads. Saving of the time overheads is mainly reflected in a page table walk process. In addition, when a quantity of levels of a page table is larger, more time overheads are saved.

page table is a four-level page table, the MMU pool performs a page table walk operation, to perform interactions with an MC for five times by using the HA, and obtain a PA corresponding to the VA after a last interaction. The MMU pool returns information such as the PA to the physical core, and the physical core updates, in the TLB, a mapping relationship between the VA and the PA. Then, the physical core may obtain corresponding data from a data cache (for example, L1/L2/L3) based on the PA. In brief, after obtaining the PA corresponding to the VA, the physical core may obtain the corresponding data according to another procedure. This is not limited in this embodiment of this disclosure.

Figure 12:
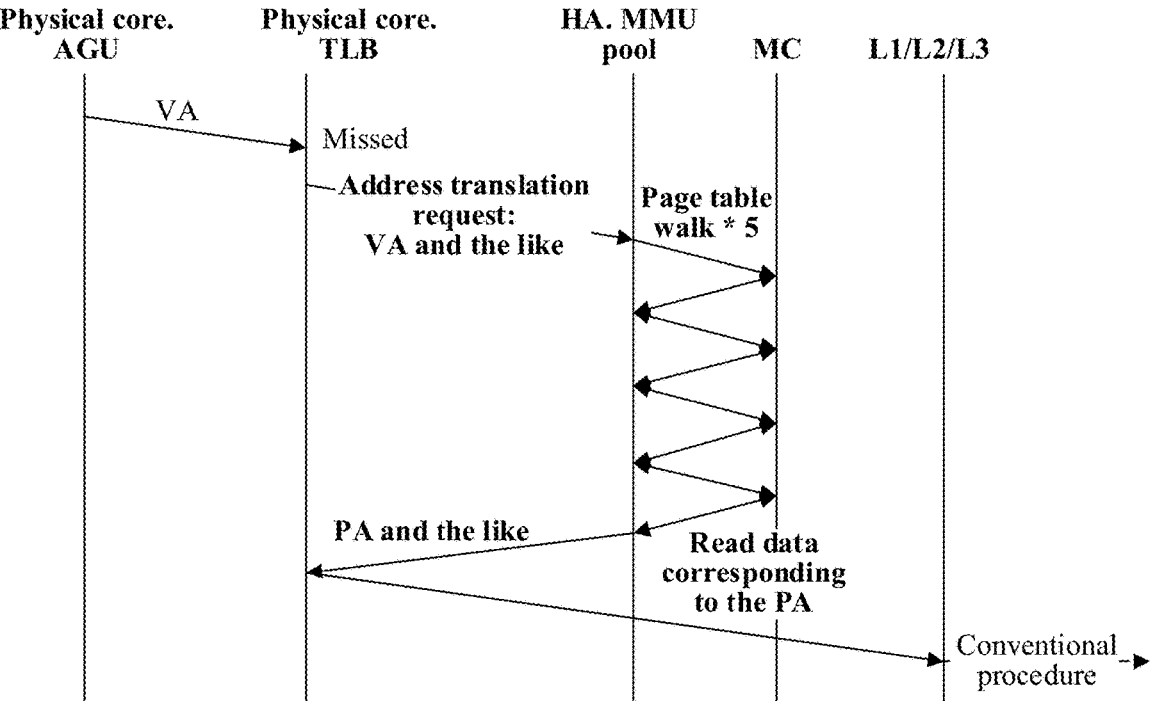
FIG. 12 is a flowchart of another method for accessing data corresponding to a VA in this solution according to an embodiment of this disclosure.
Figure 13:
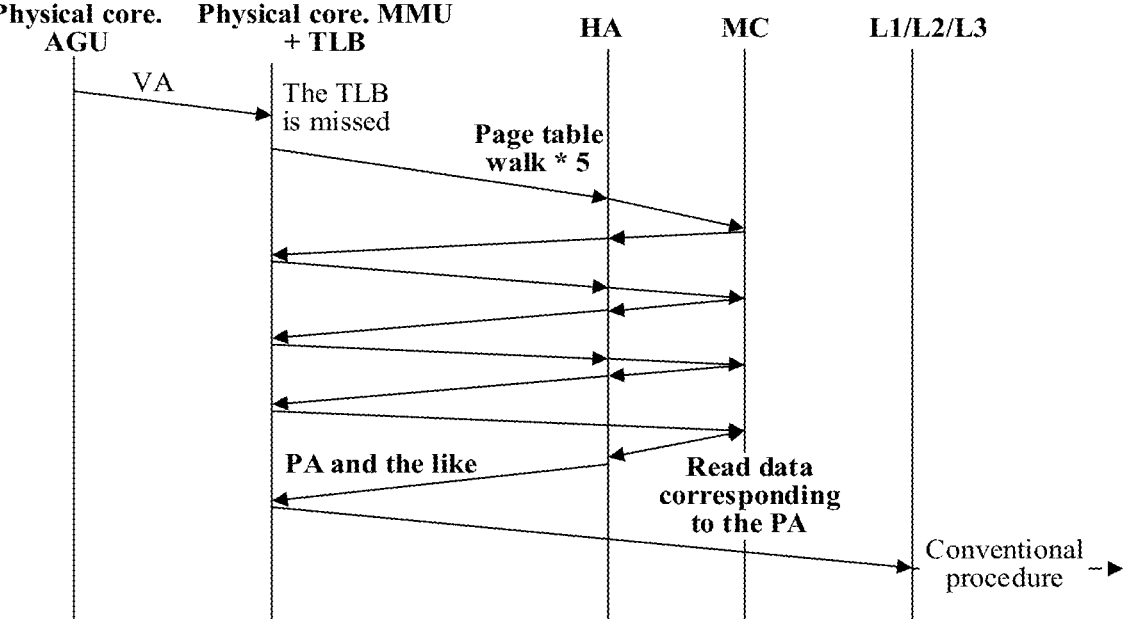
FIG. 13 is a flowchart of another method for accessing data corresponding to a VA in another technology according to an embodiment of this disclosure.

FIG. 13 is a flowchart of a method for accessing data corresponding to a VA in another technology according to an embodiment of this disclosure. A difference between the method shown in FIG. 13 and this solution shown in FIG. 12 lies in that an MMU in the other technology shown in FIG. 13 is located in a physical core, that is, far away from a main memory. It can be learned from FIG. 12 and FIG. 13 that duration consumed in a page table walk process in the other technology is greater than duration consumed in a page table walk process in this solution.

In conclusion, in this solution, the plurality of physical cores of the processor share the MMU pool. To be specific, the plurality of MMUs provide each physical core with the address translation function from a VA to a PA, rather than that one physical core corresponds to one MMU. In this way, even if an address translation requirement of a physical core is high, for example, when the main memory is concurrently

TABLE 1

| | Comparison of time overheads of accessing data corresponding to a VA, where L is a quantity of levels of a page table. | | |
|---|---|---|---|
| Scenario | In another technology: core + MMU | In this solution: HA + page table walk | Reduced overheads in this solution |
| the page table entry is missed in both the TLB and the L1/L2/L3 | t1 + L * 90 ns + 20 ns + 90 ns + t3 + t4 + t2 + 20 ns + 90 ns | t1 + L * 50 ns + 3 ns + 90 ns + t3 + t4 + t2 + 20 ns + 90 ns | ~(L * 40 + 17) ns |
| the page table entry is missed in the TLB but is hit in the L1/L2/L3 | t1 + L * 90 ns + 20 ns + 90 ns + t3 + t4 + t2 + 1 ns | t1 + L * 50 ns + 3 ns + 90 ns + t3 + t4 + t2 + 1 ns | ~(L * 40 + 17) ns |

It should be noted that the duration consumed by each step shown in FIG. 6 to FIG. 11 and Table 1 is an empirical value, that is, approximate duration, obtained based on an experiment or an actual situation, and is not used to limit embodiments of this disclosure. The duration consumed by each step varies based on different experiments or actual situations. In general, in comparison with the other technology, the time overheads of accessing the data corresponding to the VA in this solution are smaller.

FIG. 12 is a flowchart of a method for accessing data corresponding to a VA according to an embodiment of this disclosure. As shown in FIG. 12, in an implementation of this solution, a TLB is located in a physical core, and an MMU pool is located in an HA. After obtaining a VA by using an address generate unit (AGU), the physical core queries a corresponding TLB for a page table entry corresponding to the VA. If the page table entry is missed in the TLB, the physical core sends an address translation request to the MMU pool, where the address translation request carries information such as the VA. Assuming that a memory accessed, in this solution, the plurality of MMUs can serve the physical core, rather than that the physical core is limited to be served by a single MMU, thereby improving address translation efficiency and accelerating memory access.

Figure 14:
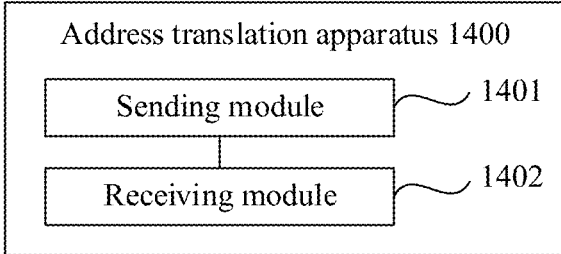
FIG. 14 is a schematic diagram of a structure of an address translation apparatus according to an embodiment of this disclosure.

FIG. 14 is a schematic diagram of a structure of an address translation apparatus 1400 according to an embodiment of this disclosure. The address translation apparatus 1400 may be implemented as a part or all of a processor by using software, hardware, or a combination thereof. The processor may be the processor shown in FIG. 1 or FIG. 4. To be specific, the apparatus 1400 is used in the processor. The processor includes a plurality of physical cores and an MMU pool. The MMU pool includes a plurality of MMUs, and the plurality of physical cores are connected to the MMU pool through an internal bus of the processor. The apparatus 1400 is used in a first physical core, and the first physical core is any one of the plurality of physical cores. Refer to FIG. 14. The apparatus 1400 includes a sending module 1401 and a receiving module 1402.

The sending module 1401 is configured to send an address translation request to the MMU pool, where the address translation request carries a to-be-translated first VA.

The receiving module 1402 is configured to receive an address translation response sent by the MMU pool, where the address translation response carries a first PA corresponding to the first VA.

Optionally, the apparatus 1400 further includes: a table querying module, configured to query, for a page table entry in which the first VA is located, a TLB corresponding to the first physical core, where one page table entry includes a mapping relationship between one VA and one PA; and a trigger module, configured to: if the TLB does not cache the page table entry in which the first VA is located, trigger the sending module 1401 to perform an operation of sending the address translation request to the MMU pool.

In this embodiment of this disclosure, the plurality of physical cores of the processor share the MMU pool. To be specific, the plurality of MMUs provide each physical core with an address translation function from a VA to a PA, rather than that one physical core corresponds to one MMU. In this way, even if an address translation requirement of a physical core is high, for example, when a main memory is concurrently accessed, in this solution, the plurality of MMUs can serve the physical core, rather than that the physical core is limited to be served by a single MMU, thereby improving address translation efficiency and accelerating memory access.

It should be noted that, when the address translation apparatus provided in the foregoing embodiment performs address translation, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. In addition, the address translation apparatus provided in the foregoing embodiment and the address translation method embodiment belong to a same concept. For a specific implementation process thereof, refer to the method embodiment. Details are not described herein again.

Figure 15:
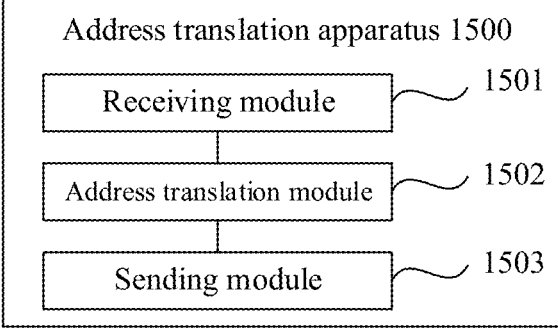
FIG. 15 is a schematic diagram of a structure of another address translation apparatus according to an embodiment of this disclosure.

FIG. 15 is a schematic diagram of a structure of an address translation apparatus 1500 according to an embodiment of this disclosure. The address translation apparatus 1500 may be implemented as a part or all of a processor by using software, hardware, or a combination thereof. The processor may be the processor shown in FIG. 1 or FIG. 4. To be specific, the apparatus 1500 is used in the processor. The processor includes a plurality of physical cores and an MMU pool. The MMU pool includes a plurality of MMUs, and the plurality of physical cores are connected to the MMU pool through an internal bus of the processor. The apparatus 1500 is used in the MMU pool. Refer to FIG. 15. The apparatus 1500 includes a receiving module 1501, an address translation module 1502, and a sending module 1503.

The receiving module 1501 is configured to receive an address translation request sent by a first physical core, where the address translation request carries a to-be-translated first VA, and the first physical core is any one of the plurality of physical cores.

The address translation module 1502 is configured to translate the first VA into a first PA.

The sending module 1503 is configured to send an address translation response to the first physical core, where the address translation response carries the first PA.

Optionally, the address translation module 1502 is configured to: query a memory page table for a page table entry in which the first VA is located, to obtain the first PA corresponding to the first VA, where the memory page table records page table entries in which all VAs in a main memory are located, and one page table entry includes a mapping relationship between one VA and one PA.

Optionally, the plurality of MMUs correspond to one management module, and the address translation module 1502 is configured to: select, from the plurality of MMUs by using the management module, one MMU as a target MMU; and translate the first VA into the first PA by using the target MMU.

In embodiments of this disclosure, the plurality of physical cores of the processor share the MMU pool. To be specific, the plurality of MMUs provide each physical core with the address translation function from a VA to a PA, rather than that one physical core corresponds to one MMU. In this way, even if an address translation requirement of a physical core is high, for example, when the main memory is concurrently accessed, in this solution, the plurality of MMUs can serve the physical core, rather than that the physical core is limited to be served by a single MMU, thereby improving address translation efficiency and accelerating memory access.

It should be noted that, when the address translation apparatus provided in the foregoing embodiment performs address translation, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. In addition, the address translation apparatus provided in the foregoing embodiment and the address translation method embodiment belong to a same concept. For a specific implementation process thereof, refer to the method embodiment. Details are not described herein again.

All or some of the foregoing embodiments may be implemented by software, hardware, firmware, or any combination thereof. When software is used for implementation, all or some of embodiments may be implemented in a form of a computer program product. The computer program product includes one or more computer instructions. When the computer instructions are loaded and executed on a computer, all or some of the procedures or functions according to embodiments of this disclosure are generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, a computer, a server or a data center to another website, computer, server or data center in a wired (for example, a coaxial cable, an optical fiber, a digital subscriber line (DSL)) or wireless (for example, infrared, radio, or microwave) manner. The computer-readable storage medium may be any usable medium that can be accessed by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like. It should be noted that the computer-readable storage medium mentioned in embodiments of this disclosure may be a non-volatile storage medium, that is, may be a non-transitory storage medium.

It should be understood that "at least one" mentioned in this specification refers to one or more, and "a plurality of" refers to two or more. In the descriptions of embodiments of this disclosure, "/" means "or" unless otherwise specified. For example, A/B may represent A or B. In this specification, "and/or" describes only an association relationship between associated objects and represents that three relationships may exist. For example, A and/or B may represent the following three cases. Only A exists, both A and B exist, and only B exists. In addition, to clearly describe the technical solutions in embodiments of this disclosure, terms such as "first" and "second" are used in embodiments of this disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that information (including but not limited to user equipment information, user personal information, and the like), data (including but not limited to data used for analysis, stored data, displayed data, and the like), and signals in embodiments of this disclosure are used under authorization by the user or full authorization by all parties, and capturing, use, and processing of related data need to conform to related laws, regulations, and standards of related countries and regions.

The foregoing descriptions are embodiments of this disclosure, but are not intended to limit this disclosure. Any modification, equivalent replacement, or improvement made within the spirit and principle of this disclosure should fall within the protection scope of this disclosure.

What is claimed is:

1. A processor, comprising:
an internal bus;
a memory management unit (MMU) pool comprising a plurality of MMUs; and
a plurality of physical cores connected, through the internal bus, to the MMU pool, wherein plurality of physical cores comprises a first physical core that is any one of the plurality of physical cores, and wherein the first physical core is configured to:
query, for a page table entry in which a to-be-translated first virtual address (VA) is located, a translation lookaside buffer (TLB) corresponding to the first physical core, wherein the page table entry comprises a mapping relationship between the to-be-translated first VA and a first physical address (PA);
send, to the MMU pool of the processor, an address translation request when the TLB does not cache the page table entry, wherein the address translation request carries the to-be-translated first VA; and
receive, from the MMU pool, an address translation response carrying the first PA corresponding to the to-be-translated first VA.

2. The processor of claim 1, wherein the MMU pool is further configured to provide an address translation function for the plurality of physical cores and a peripheral connected to the processor.

3. The processor of claim 1, wherein the MMU pool is located in a home agent (HA) of the processor.

4. The processor of claim 1, wherein the MMU pool is located in a memory controller (MC) of the processor.

5. The processor of claim 1, wherein the MMU pool is further configured to:
receive the address translation request;
translate the to-be-translated first VA into the first PA; and
send the address translation response to the first physical core.

6. The processor of claim 5, wherein the MMU pool is further configured to query a memory page table for the page table entry to obtain the first PA corresponding to the to-be-translated first VA, and wherein the memory page table records page table entries in which all VAs in a main memory are located.

7. The processor of claim 6, wherein the memory page table is a single-level page table.

8. The processor of claim 6, wherein the memory page table is a multi-level page table.

9. The processor of claim 1, wherein the processor is a general-purpose processing unit.

10. The processor of claim 1, wherein the processor is a network processor (NP).

11. The processor of claim 1, wherein the processor is an application-specific integrated circuit (ASIC).

12. The processor of claim 1, wherein the processor is a programmable logic device (PLD).

13. The processor of claim 12, wherein the PLD is a complex programmable logic device (CPLD).

14. The processor of claim 12, wherein the PLD is a field-programmable gate array FPGA).

15. The processor of claim 12, wherein the PLD is a generic array logic (GAL).

16. A method, comprising:
querying, by a first physical core of a processor and for a page table entry in which a to-be-translated first virtual address (VA) is located, a translation lookaside buffer (TLB) corresponding to the first physical core, wherein the page table entry comprises a mapping relationship between the to-be-translated first VA and a first physical address (PA);
the TLB does not cache the page table entry;
sending, by the first physical core of the processor and to a memory management unit (MMU) pool of the processor, an address translation request in response to the TLB does not cache the page table entry, wherein the MMU pool comprises a plurality of MMUs, wherein the address translation request carries the to-be-translated first VA, and wherein the first physical core is any one of a plurality of physical cores of the processor; and
receiving, by the first physical core and from the MMU pool, an address translation response carrying the first PA corresponding to the to-be-translated first VA.

17. A method, comprising:
a translation lookaside buffer (TLB), corresponding to a first physical core of a processor, does not cache a page table entry comprising a mapping relationship between a to-be-translated first virtual address (VA) and a first physical address (PA), wherein a memory management unit (MMU) pool comprises a plurality of MMUs, wherein an address translation request carries the to-be-translated first VA, and wherein the first physical core is any one of a plurality of physical cores of the processor;
receiving, by the MMU pool of the processor and from the first physical core, the address translation request in response to the TLB does not cache the page table entry;
translating, by the MMU pool, the to-be-translated first VA into the first PA; and sending, by the MMU pool and to the first physical core, an address translation response carrying the first PA corresponding to the to-be-translated first VA.

18. The method of claim 17, wherein translating the to-be-translated first VA into the first PA comprises querying, by the MMU pool and for the page table entry in which the to-be-translated first VA is located, a memory page table to obtain the first PA corresponding to the to-be-translated first VA, and wherein the memory page table records page table entries in which all VAs in a main memory are located.

19. The method of claim 17, wherein the plurality of MMUs correspond to one management module, and wherein translating, the to-be-translated first VA into the first PA comprises:

selecting, by the MMU pool, from the plurality of MMUs, and by using the management module, one MMU as a target MMU; and translating, by the MMU pool and by using the target MMU, the to-be-translated first VA into the first PA.

20. The method of claim 17, further comprising querying, by the MMU pool, a memory page table for the page table entry to obtain the first PA corresponding to the to-be-translated first VA, wherein the memory page table records page table entries in which all VAs in a main memory are located.

\* \* \* \* \*